May 18, 1965 C. H. WICKENBERG 3,184,579
IMMERSIBLE ELECTRIC COOKING VESSEL
Filed March 12, 1962 3 Sheets-Sheet 1

INVENTOR:
Chester H. Wickenberg
BY
George R. Clark
Atty

May 18, 1965  C. H. WICKENBERG  3,184,579
IMMERSIBLE ELECTRIC COOKING VESSEL
Filed March 12, 1962  3 Sheets-Sheet 2

INVENTOR.
Chester H. Wickenberg
BY
George R. Clark
Atty

May 18, 1965  C. H. WICKENBERG  3,184,579
IMMERSIBLE ELECTRIC COOKING VESSEL
Filed March 12, 1962  3 Sheets-Sheet 3
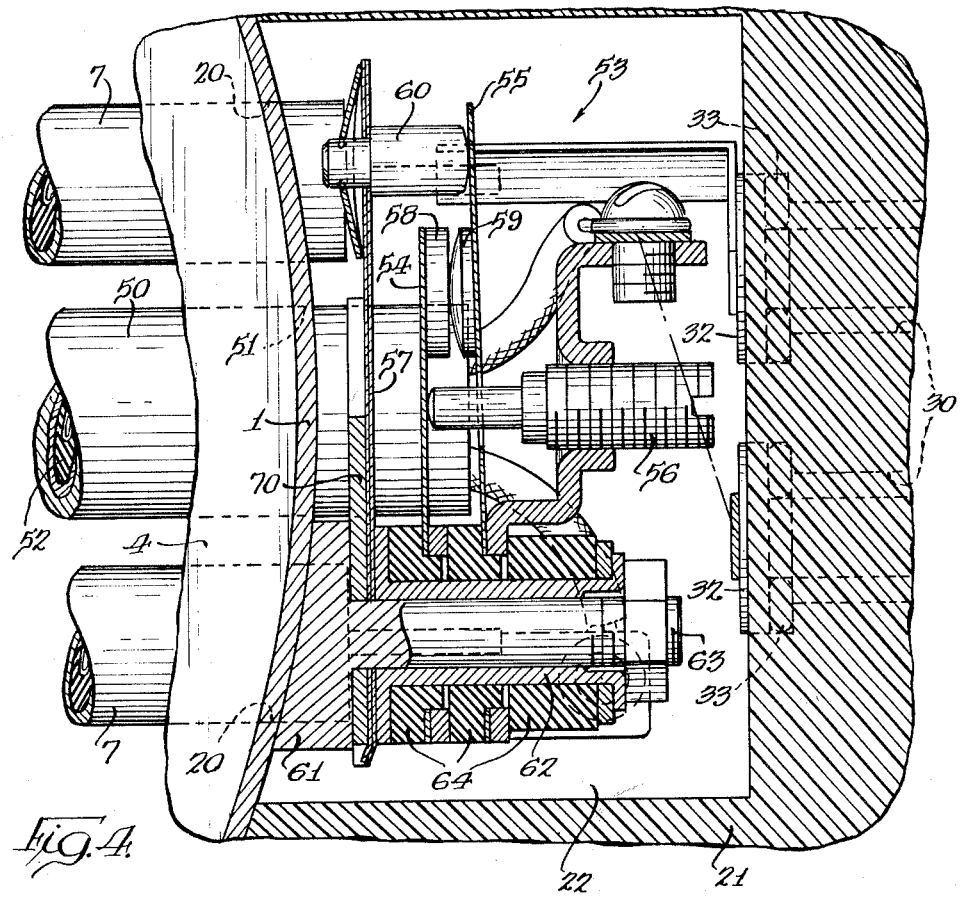
INVENTOR.
Chester H. Wickenberg
BY
George R. Clark
Atty

United States Patent Office 3,184,579
Patented May 18, 1965

3,184,579
IMMERSIBLE ELECTRIC COOKING VESSEL
Chester H. Wickenberg, Elgin, Ill., assignor to Sunbeam Corporation, Chicago, Ill., a corporation of Illinois
Filed Mar. 12, 1962, Ser. No. 178,958
10 Claims. (Cl. 219—441)

This invention relates to an improved electrical heating device, and more particularly, to improved electrical heating devices such as electrical cooking devices.

The invention will be illustrated in connection with an electrical coffee making device. However, the invention is not restricted in its utility to coffee makers but is useful in other types of electrical cooking devices.

It is an object of this invention to provide an improved immersible electrical cooking device. By the term immersible device is meant a device which can be safely immersed in a liquid for cleaning and the like without danger of damage to the components thereof, such as its electrical circuit elements.

It is a further object of the invention to provide an improved sealing means for immersible electrical cooking devices.

It is a further object of the invention to provide an improved immersible electrical coffee making device which has fewer parts, is more easily fabricated, and lower in cost than comparable prior art electrical coffee making devices.

Briefly, in the preferred form of the invention the underside of the bottom of a coffee making vessel is open or uncovered and connected to said underside is an exposed sheathed electrical heating element. A closure member which is relatively small in comparison to the size of the vessel is provided for protecting the terminal ends of the heating element and the other electrical circuit components against access of moisture whereby the coffee maker can be fully immersed in a liquid for cleaning and the like. Preferably the closure member is supported on a lower rim of the vessel which extends below the vessel bottom. The closure member may comprise essentially a single piece component which is fabricated from an electrical and thermal insulating material which can be formed into the required shape by molding or casting. Inasmuch as the terminal ends of the electrical heater and the other electrical circuit components are enclosed within the closure member, it is unnecessary to provide a watertight cover for the bottom of the vessel. The lower rim of the vessel is used as a means for spacing the sheathed heating element from support surfaces such as table tops or the like. To this end a plurality of thermal insulating material feet can be connected to the lower rim of the vessel. One of these feet can comprise an integral portion of the closure member, and the handle for the vessel may also comprise an integral portion of the closure member. A pair of plug-in type electrical connectors are mounted in the closure member and the closure member projects laterally away from the bottom of the vessel so as to afford easy access to the plug-in connectors. The necessary electrical connections between the plug-in connectors and the heating element are made inside the watertight closure member and an electrical switch for controlling the cooking device is also contained within the closure member. Two heating elements may be provided for the coffee maker. One of the heating elements is a main or high wattage heater for brewing the coffee, and the other is an auxiliary or low wattage heater for keeping the brewed coffee warm. Both heaters are controlled by the switch within the closure member and the terminal ends of the auxiliary heater are protected against access of moisture by the closure member similar to the main sheathed heating element.

The features of the invention which are believed to be novel are set forth with particularity in the appended claims. The invention itself, however, both as to its organization and operation, together with further objects and advantages thereof, may best be understood by reference to the following description taken in connection with the accompanying drawings.

In the drawings,

FIG. 4 is an enlarged sectional view taken along the section line 4—4 of FIG. 2; and FIG. 5 is a diagrammatic electrical circuit illustration of the coffee maker.

Figure 1:
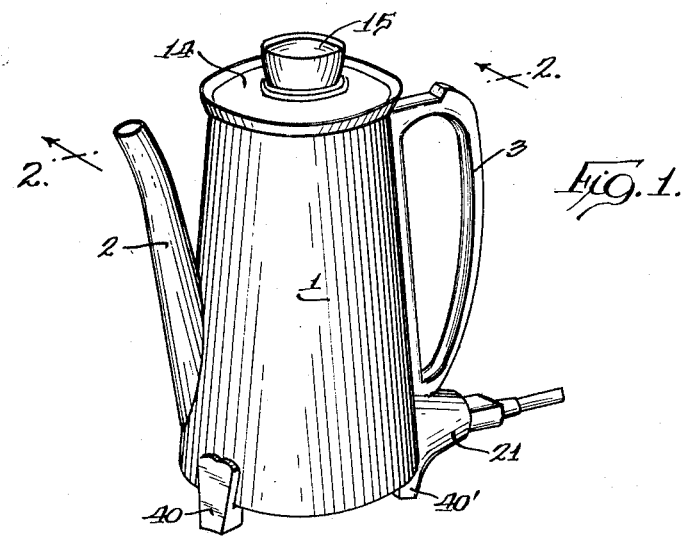
FIG. 1 is a perspective view of a coffee maker utilizing the invention.
Figure 3:
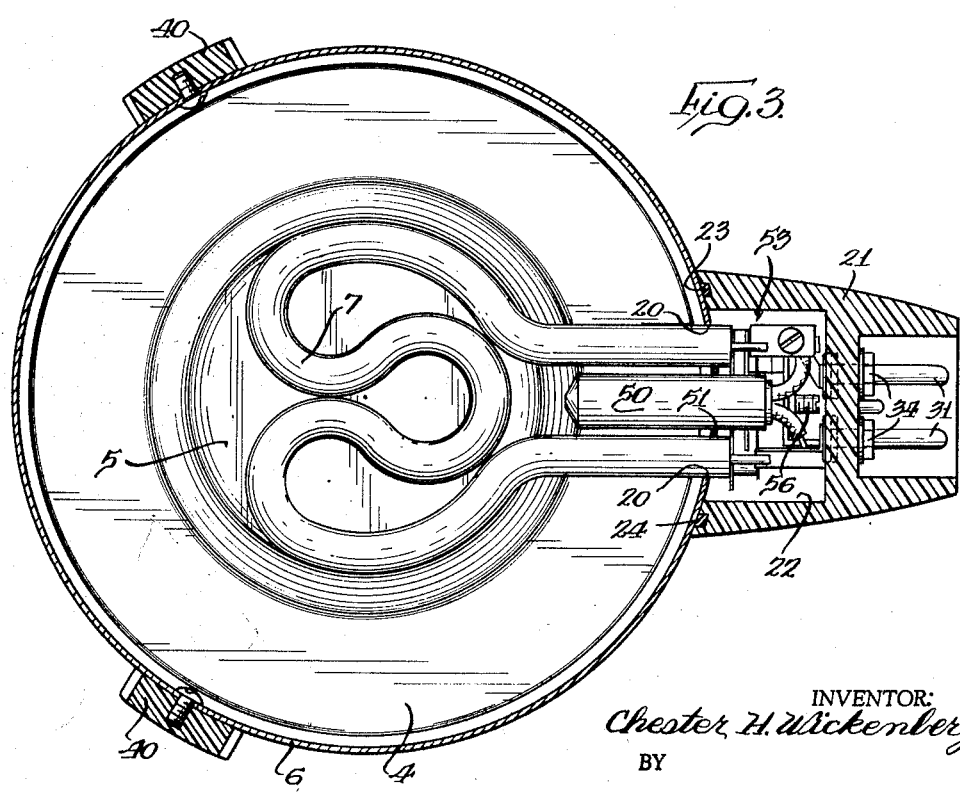
FIG. 3 is a sectional view taken along the section line 3—3 of FIG. 2.
Figure 2:
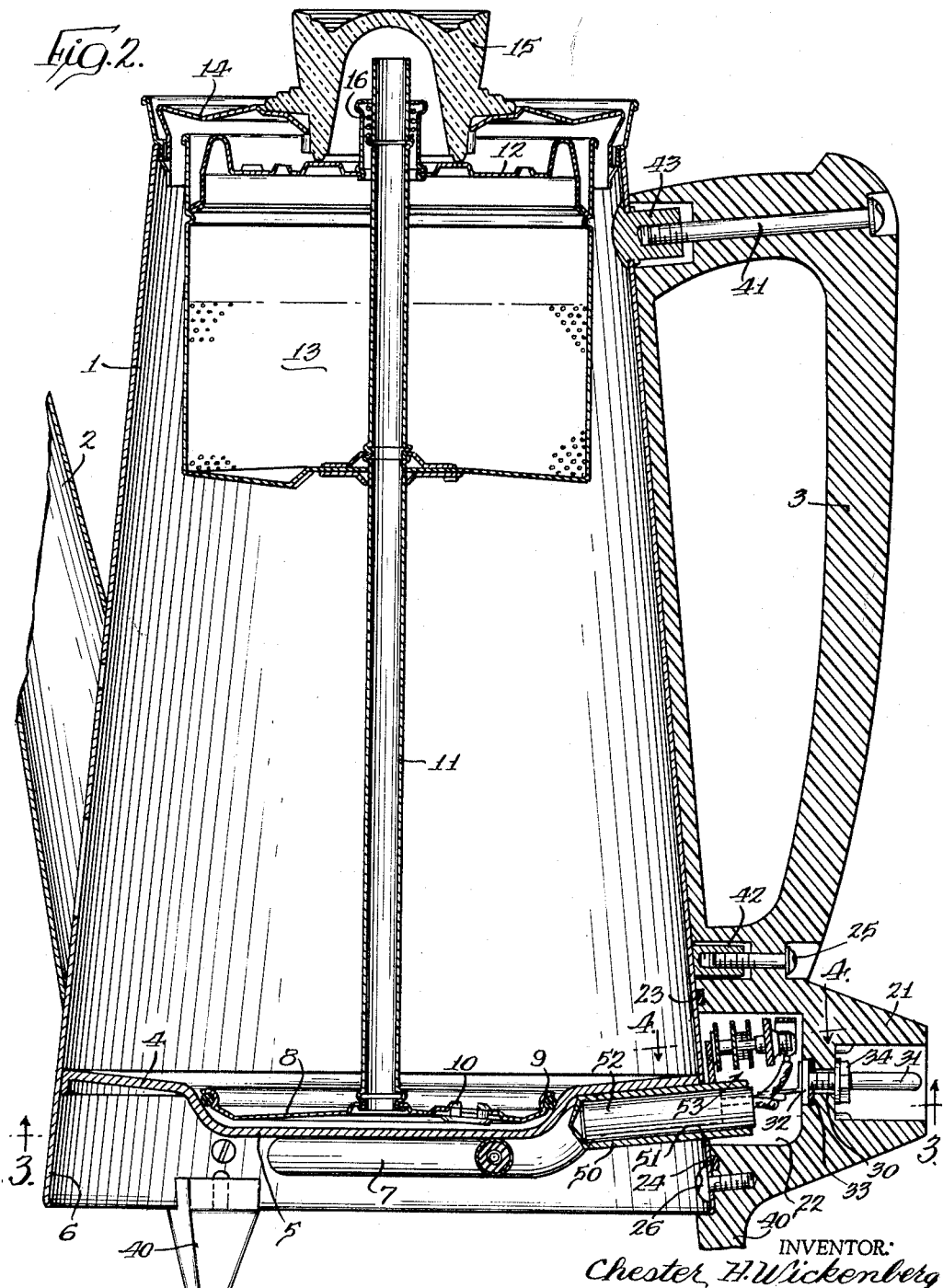
FIG. 2 is an enlarged sectional view taken along the section line 2—2 of FIG. 1.

Referring now particularly to the drawings, illustrated therein is a percolator type electrical coffee maker. The coffee maker comprises a vessel 1 having a pouring spout 2 and handle 3 connected thereto. Vessel 1 is provided with a bottom 4 which is depressed at its central portion to define a well 5 for a percolator pump mechanism. The lower end of the side walls of vessel 1 extend beneath the bottom 4 to in effect provide a rim 6 or support plate which extends peripherally about the vessel bottom.

A metallic sheathed heating element 7 is connected to the underside of bottom 4 in good thermal conducting relationship therewith such as by brazing. As will be obvious to those skilled in the art, when the heater 7 is energized the percolator pump of the coffee maker will be operated to brew coffee. The percolator pump comprises a closure member 8 for the well 5 having a seal 9 extending about its periphery. Closure member 8 is provided with a one-way valve 10, and a hollow stem 11. When the pump well 5 is empty, valve 10 will be opened to admit water therein. When the water in well 5 is heated its pressure increases to close valve 10 and cause the pressurized liquid in well 5 to be raised in the stem 11 and out of the upper open end thereof through a strainer 12 into a perforated coffee basket 13 for holding the coffee grains. The upper end of vessel 1 is closed by a cover 14 having a hollow glass or other transparent material knob 15. The closure member 8 is retained in sealed seated position with respect to the well 5 by the downward bias of knob 15 transmitted to the stem 11 through the strainer 12 and a spring 16 acting between the strainer 12 and stem 11.

The heating element 7 is well known to those skilled in the art and comprises an exterior water impervious metallic sheath. Positioned within the sheath is a helical electrical resistance heating element which has its turns insulated from each other and from the metallic sheath by an electrical insulating material compound which is also a good conductor of heat to effect transmission of heat from the helical electrical resistance heating element to the metallic sheath. The sheathed heating element 7 is in the form a re-entrantly curved loop which is positioned against the exterior of bottom 4 so as to obtain a high concentration of heat at the pump well 5 so as to obtain rapid percolator action, and therefore, quick coffee brewing.

The opposite ends of sheathed heater 7 are disposed adjacent to each other in spaced relationship and extend in a radially outward direction with respect to the bottom 4. A pair of apertures 20 are provided in the rim 6 and the outer ends of the sheathed heater 7 extend into apertures 20. These apertures 20 are sealed closed against the entrance of water by a brazing compound or the like between the edges of apertures 20 and the metallic sheath of heater 7. A water impervious closure member 21 is provided over the apertures 20 and the ends of the sheathed heater which extend into apertures 20. The closure member 21 is sealed closed against the entrance of moisture. Accordingly, the outer ends of the sheath which open into a chamber 22 defined by closure member 21 do not have to be sealed closed.

The closure member 21 comprises essentially a single piece multi-sided hollow element which is constructed from a thermal and electrical insulating material. Closure member 21 may be fabricated by a molding or casting operation. The side of closure member 21 which is positioned against the side of vessel 1 is open to afford entry of the ends of the sheathed heating element 7 into the chamber 22. The rim 6 performs the function of a support member for closure member 21. The open side of closure member 21 is bounded by a continuous groove 23 and a sealing gasket 24 is positioned therein. Closure member 21 is fastened to the vessel 1 and rim 6 by means such as studs 25 and 26 which cause compression of gasket 24 to seal close the open side of closure member 21.

The closure member 21 is relatively small when compared to the size of vessel 1, and is positioned adjacent the bottom thereof in laterally projecting relationship. The outer side of closure member 21 has a pair of openings 30 formed therein, and in openings 30 are mounted a pair of plug-in type electrical connectors 31.

The innermost ends of the connectors 31 have flanges 32 formed thereon. Sealing gaskets 33 are provided between the flanges 32 and the openings 30 for sealing the openings 30 closed. Sealing gaskets 33 are compressed closed by nuts or the like 34 on the connectors 31. The chamber 22 within closure member 21 provides a space for making the necessary electrical connections between the connectors 31 and the terminal ends of heater 7 whereby these electrical connections do not need to be provided with sealing means against the access of moisture or liquid thereto.

Inasmuch as the terminal ends of heater 7 and the electrical connections between heater 7 and connectors 31 are sealed closed within chamber 22, it is not necessary to provide a cover, closure, or seal for the bottom part of the coffee maker as in the prior art. The sheathed heater 7 is impervious to water, and therefore, it can be left bare or exposed to the atmosphere and no harm will be done if liquid comes in contact therewith during immersion of the coffee maker in a cleaning liquid. Since the heater 7 is exposed, it is desirable to have it spaced from support surfaces such as table tops or the like. Rim 6 alone can be utilized for this purpose. However, in the preferred form of the invention, thermal insulating means such as feet 40 are connected to rim 6. A plurality of feet 40 are provided on rim 6 in peripherally spaced relationship. One of the support feet 40' preferably comprises an integral portion of the closure member 21. Additionally, the handle 3 also preferably comprises an integral portion of closure member 21. These integral portions 21, 40' and 3 can be readily fabricated by a molding or casting operation. The upper end of handle 3 is connected to vessel 1 by means such as a stud 41. The studs 25 and 41 are connected to the vessel 1 by means such as bosses or the like 42 and 43 connected to the sides of vessel 1 by means such as welding.

It will now be seen that the invention provides an immersible coffee maker which has fewer parts and is more easy to assemble than comparable prior art coffee makers whereby the coffee maker of the instant invention is lower in cost than prior art coffee makers. In the preferred form of the invention an auxiliary heater is provided for keeping the coffee warm after it has been brewed by the heater 7. The auxiliary heater comprises a tubular element 50 which is disposed between the opposite ends of heater 7 in good thermal conducting relationship with the bottom of the vessel as by brazing thereto. The inner end of tubular member 50 is closed and its outer end is open. Its outer end extends into the chamber 22 through an aperture 51 formed in rim 6 between the apertures 20. Aperture 51 is sealed closed similar to apertures 20 and the outer end of tubular member 50 opens into chamber 22.

A heating element 52 is positioned in the tubular element 50 whereby the tubular element 50 in effect serves as a water impervious sheath for the heater 52. Heater 52 is a keep-warm heating element. That is to say, it is for merely keeping the brewed coffee warm and not for percolating or repercolating the brewed coffee. Therefore, the tubular element 50 is positioned against that part of bottom 4 which is disposed radially outward of the well 5. The terminal ends of heater 52 are connected in electrical circuit relationship with the plug-in connectors 31 and the heater 7 inside the chamber 22.

The heater 7 may comprise a high wattage heater having a rating of about 1000 watts, and the heater 52 may comprise a low wattage heater having a rating of about 40 watts. These high and low wattage heaters are controlled by a switch indicated generally by reference numeral 53 (see FIG. 4) positioned within chamber 22. Accordingly, the chamber 22 provided by closure member 21 in effect is an electrical terminal connection and switch chamber. The switch 53 in effect de-energizes the main heater 7 when brewing of the coffee is finished and at the same time in effect energizes the auxiliary heater 52. Switch 53 comprises a pair of contact arms 54 and 55. Contact arm 54 can be viewed as the stationary one although it is movable for adjustment purposes by an adjusting element 56. Contact arm 55 is termed the movable one inasmuch as it is moved from closed to open position by a thermally responsive bimetallic element 57 when the coffee is brewed. The outer ends of contact arms 54 and 55 have engageable and disengageable contacts 58 and 59, respectively. The bimetallic element 57 makes contact with the outer end of movable contact arm 55 through an insulating material button 60 connected to the outer end of bimetallic element 57.

The switch 53 is mounted in chamber 22 on a switch mounting boss or the like 61. Element 61 is constructed from a metal which is a good thermal conductor and is connected with the side of vessel 1 by welding or the like so as to function as a heat transmitting lug which will provide the bimetallic element 57 with accurate response to the temperature of the liquid in vessel 1. Bimetallic element 57 is mounted in good thermal conducting relationship with respect to the heat lug 61. The switch 53 comprising elements 54 to 60 is a subassembly which can be preassembled and then mounted on heat lug 61. That is to say, switch elements 54 to 60 are assembled on a tubular element 62 which is then mounted on the heat lug 61 by a stud or the like 63 passing through tubular element 62 for connection to the heat lug 61. The contact arms are electrically insulated from each other and the tubular element 62 and bimetallic element 57 by a plurality of rubber or other electrical insulating rings 64 mounted on tubular element 62.

The electrical circuit for the connectors 31, the heating elements 7 and 52 and the switch is illustrated diagrammatically in FIG. 5. When the vessel 1 is filled with cold water for making coffee the contacts 58 and 59 are closed. The electrical circuit is energized by connecting a conventional female plug-in type of electrical cord connector with the connectors 31. The high wattage heating element 7 is a relatively low resistance heater, whereas the heating element 52 is a relatively high resistance heater. The closed contacts 58 and 59 in effect form a shunt around the heater 52 whereby, as a practical matter, it draws negligible current. Therefore, the heater 7 draws a relatively high current and rapidly brews the coffee by operating the percolator pump. When the coffee is done, the contents of the vessel will have warmed the heat lug 61 which in turn will have warmed the bimetallic element 57 so that it flexes in a direction to separate the contacts 58 and 59 by moving contact arm 55 away from contact arm 54. Opening of switch contacts 58 and 59 places the high resistance heating element 52 in series with the low resistance heating element 7 whereby heating element 7 draws negligible current or insufficient current to operate the percolator pump. That is to say, the main heater 7 now generates a negligible amount of heat. However, the heat generated by the heater 52 is a sufficient heat supplement to make up for the heat lost by the brewed coffee to the atmosphere so that it is maintained at the coffee serving temperature. This serving temperature is slightly less than the coffee brewing temperature. However, the bimetallic element 57 will not deflect in an opposite direction upon de-energization of the main heater 7 so as to reclose the contacts 58 and 59 and cause rebrewing of the coffee. This is because some of the heat generated by the heater 52 is directed to the bimetallic element 57 in order to keep it deflected in a switch opening direction so as to maintain contacts 58 and 59 open after the coffee brewing cycle has been completed and the coffee is retained warm by the heater 52. The manner in which the auxiliary heater 52 retains the bimetallic element 57 deflected in a contact opening position will now be described.

The part of the tubular element or sheath 50 of heating element 52 which is disposed in the chamber 22 has a heat conducting strip 70 connected thereto in good thermal conducting relationship as by brazing. The switch mounting boss and heat lug 61 is positioned within chamber 22 slightly above the ends of the sheaths of the two heaters. The conducting strip 70 extends from the sheath 50 to the heat lug 61. The stud 63 acting through the sleeve 62 retains the heat lug 61, the heat conducting strip 70 and the bimetallic element 57 in good thermal conducting relationship to each other. That is to say, the heat conducting strip 70 is clamped between the heat lug 61 and the bimetallic strip 57. Accordingly, when the heater 52 is energized some of the heat generated thereby is directed from the tube 50 via the heat conducting strip 70 to the bimetallic element 57 so as to retain it in its deflected switch opening position. Accordingly, even though the heat lug 61 may cool slightly after the coffee is brewed, the switch will not be reclosed to repercolate the finished coffee.

The adjusting element 56 is a factory adjusting member. That is to say, it is set at the factory to provide brewed coffee of average strength. If mild or strong coffee is desired, then it is necessary to open the closure member 21 and adjust the element 56. A manual means for adjusting member 56 without opening the closure member 21 may be provided to enable the coffee maker user to select mild or strong coffee. Such manual adjusting means could comprise a manually operated member extending through the closure member 21 for operating the adjusting element 56. However, if this is done in connection with the invention, it will be appreciated by those skilled in the art that the opening in closure member 21 for the movable manual adjusting means will have to be sealed closed to retain the fully immersible feature of the instant invention.

In the invention an improved seal is provided for immersible electrical cooking devices since the closure member is relatively small. For example, it is possible to make an electrical cooking vessel immersible by providing a relatively large generally cup-shaped closure member for the entire bottom of the vessel. However, a relatively large closure member has the disadvantage that a relatively large area must be made watertight. That is to say, in the case of a cup-shaped closure member for the entire vessel bottom, the interface between the rim of the cup-shaped member and the vessel bottom is extensive and therefore more difficult to seal. However, with a relatively small closure member the interface is correspondingly smaller and easier to seal. In the invention the sealed interface between the closure member and the vessel is additionally easier to maintain watertight due to the preferred location of the closure member. That is, the closure member is positioned against the side of the vessel which presents a broad surface against which to compress the seal. The utilization of a broad surface against which to compress the seal provides the advantage that there are no special problems of alignment. That is, even if the closure member shifts up or down or laterally along the side of the vessel, the seal still remains under compression.

While there has been shown and described a particular embodiment, it will be obvious to those skilled in the art that changes and modifications may be made without departing from the invention, and that it is intended by the appended claims to cover all such changes and modifications as fall within the true spirit and scope of the invention.

What is claimed as new and desired to be secured by Letters Patent of the United States is:

1. In a cooking device, a vessel, electrical heating means mounted adjacent the bottom of the vessel, water impervious hollow closure means positioned adjacent the side of the vessel, said closure means projecting laterally from the side of said vessel for a short distance as compared to its diameter, said closure means comprising a single piece integral member and being formed from an electrical and thermal insulating material, opening means formed in said closure means adjacent said vessel side, water impervious sheath means for said heating means extending into said opening means and opening into said closure means but otherwise being closed, aperture means formed in said closure means, plug-in type electrical connector means mounted in said aperture means for energizing said cooking device, a switch in said closure means electrically connected to said connector means and heating means for controlling said cooking device, water impervious seals for said opening and aperture means whereby said cooking device is fully immersible in liquid for washing, said closure means being devoid of opening or aperture means other than the mentioned opening and aperture means, and said closure means being relatively small as compared to the size of said vessel.

2. In a cooking device, a vessel, a pair of electrical heating elements mounted adjacent the bottom of the vessel, one of the heating elements comprising a main heater and the other comprising a keep warm heater, water impervious hollow closure means positioned adjacent the side of the vessel, said closure means projecting laterally from the side of said vessel for a short distance as compared to its diameter, said closure means comprising a single piece integral member and being formed from an electrical and thermal insulating material, opening means formed in said closure means adjacent said vessel side, a water impervious sheath for said heating elements extending into said opening means and opening into said closure means but otherwise being closed, aperture means formed in said closure means, plug-in type electrical connector means mounted in said aperture means for energizing said cooking device, a switch in said closure means electrically connected to said connector means and heating elements for controlling said cooking device, water impervious seals for said opening and aperture means whereby said cooking device is fully immersible in liquid for washing, said closure means being devoid of opening or aperture means other than the mentioned opening and aperture means, and said closure means being relatively small as compared to the size of said vessel.

3. In a cooking device as in claim 1, wherein the sheath of said heating element is bare for exposure to said liquid.

4. In a cooking device as in claim 2, wherein the sheath of said heating elements is bare for exposure to said liquid.

5. In a cooking device, a vessel, a pair of sheathed electrical heating elements mounted on the underside of the bottom of the vessel in good thermal conducting relationship therewith, one of said heating elements comprising a main heater and the other comprising a keep warm heater, a support member on the bottom of the vessel, aperture means formed in said support member, a single piece integral hollow closure member formed from an electrical and thermal insulating material, said closure member being open on one side thereof, said open side being supported on said support member in surrounding relationship with respect to said aperture means, said closure member projecting laterally from the side of the vessel for a short distance as compared to its diameter, the sheaths of said heating elements being water impervious and extending into said aperture means and opening into said closure member but otherwise being closed, another side of said closure member having opening means formed therein, plug-in type electrical connector means mounted in said opening means for energizing said cooking device, a switch in said closure member electrically connected inside said closure member to said connector means and heating elements for controlling said cooking device, water impervious seals for said aperture means, closure member open side and opening means whereby said cooking device is fully immersible in liquid for washing, the sheaths of said heating elements being metallic and unprotected from contact with said liquid, said closure member being relatively small as compared to the size of said vessel, and aside from the mentioned water impervious seals said closure member being completely sealed closure solely by integral portions thereof whereby it is devoid of entrance means aside from the mentioned aperture and opening means and open side.

6. An electric coffee maker, comprising, a vessel which is tall as compared to its diameter, a sheathed heating element connected to the underside of the bottom of the vessel, a support member mounted adjacent the periphery of the vessel bottom, said support member extending below the vessel bottom, aperture means formed in said support member, the sheath of said heating element extending into said aperture means, a seal for sealing said aperture means closed, a multi-sided integral single piece closure member superposed over said aperture means, said closure member being hollow to provide an electrical connections chamber therein, the side of said closure member adjacent to said support member being open and supported on said support member and receiving the terminal ends of said heating element therethrough for entry into said chamber, said closure member laterally projecting from said support member a short distance as compared to the diameter of said vessel, a seal for sealing said open side closed, plug-in type electrical connectors extending through opening means formed in another side of said closure member for energizing said coffee maker, a seal for sealing said opening means closed, electrical connections inside said chamber for electrically connecting said electrical connectors and heating element together, said three-mentioned seals, sheath, and closure member being water impervious whereby said coffee maker is fully immersible in liquid for washing, the bottom of said vessel being uncovered for exposure of said sheath to said liquid, and said closure member being small as compared to the size of said vessel.

7. In an electric coffee maker as in claim 6, said sheathed heating element comprising a high wattage heater for brewing coffee in said coffee maker, and another sheathed heating element, said another heating element comprising a low wattage heater for keeping brewed coffee warm, said another heating element being connected to the underside of the bottom of the vessel, additional aperture means formed in said support member adjacent said first-mentioned aperture means, the sheath of said another heating element extending into said additional aperture means, a seal for sealing said additional aperture means closed, the terminal ends of said another heating element extending through said sealed closed open side of the closure member into said chamber, a switch in said chamber, said switch being electrically connected to said heating elements for in effect deenergizing the high wattage heater and energizing the low wattage heater when coffee is brewed, and the seal for said additional aperture means and the sheath of said another heating element being water impervious to maintain said coffee maker fully immersible in liquid for washing, and aside from the four mentioned water impervious seals said closure member being completely sealed closed solely by integral portions thereof whereby it is devoid of entrance means aside from the mentioned opening and two aperture means and open side.

8. An electric coffee maker, comprising, a vessel which is tall as compared to its diameter, a looped metal sheathed electrical heater element connected to the underside of the bottom of the vessel, a rim extending continuously about the bottom of the vessel, said rim extending below the vessel bottom, a pair of adjacent apertures formed in said rim, the opposite ends of said heater element being disposed adjacent to each other and extending through said apertures, a seal for sealing said apertures closed, a single piece integral multi-sided laterally projecting closure member superposed over said extending heater element ends, said closure member being hollow to provide an electrical terminal and switch chamber therein and being formed from an electrical and thermal insulating material, the side of said closure member adjacent to said rim being open and supported on said rim and receiving said heater element ends therethrough for entry into said chamber, said closure member laterally projecting from said rim a short distance as compared to the diameter of said rim, a seal for sealing said open side closed, a pair of plug-in type electrical connectors extending through a pair of openings formed in an opposite side of said closure member for energizing said coffee maker, a seal for sealing said openings closed, an electric switch positioned in said chamber for controlling said heating element, electrical terminals inside said chamber for connecting said electrical connectors, switch and heating element together in electrical circuit, said three-mentioned seals, the closure member and sheath of the heating element being watertight whereby said coffee maker is immersible in liquid for washing, the lower end of said rim being substantially fully open whereby the sheath of the heater element is exposed to the atmosphere, thermal insulating material support means connected to the rim for spacing the heater element from support surfaces such as table tops or the like, and said closure member being small as compared to the size of said vessel.

9. In a coffee maker as in claim 8, wherein a generally elongated hollow metal member is connected to the underside of the bottom of said vessel between the adjacent ends of the sheathed heater element, the inner end of said elongated hollow member being closed and its outer end being open and extending through another aperture formed in the rim into said chamber, a watertight seal for said another aperture, a keep warm electrical heater positioned in said elongated hollow member, said keep warm heater being connected in said electrical circuit, said switch being operative to in effect turn said sheathed heater off and said keep warm heater on when coffee is brewed, said elongated hollow member serving as a water impervious sheath for said keep warm heater whereby said coffee maker is immersible in liquid for washing, and aside from the four mentioned watertight seals said closure member being completely sealed closed solely by integral portions thereof.

10. In a coffee maker as in claim 9, wherein the second-mentioned seal is formed between the open side of the closure member and the rim and side of the vessel, a handle for the vessel extending vertically along the side of the vessel, said handle and closure member being integral with each other, said support means comprising support feet connected to the rim, the support feet being spaced from each other about the rim, and one of the support feet being integral with the closure member.

References Cited by the Examiner
UNITED STATES PATENTS

| | | | |
|---|---|---|---|
| 2,611,070 | 9/52 | Chandler | 219—441 |
| 2,829,583 | 4/58 | Leonard | 219—507 X |
| 2,839,662 | 6/58 | Theisen | 219—441 |
| 2,860,229 | 11/58 | Ziegler | 219—442 |
| 2,872,561 | 2/59 | Humphrey | 219—441 |
| 3,022,411 | 2/62 | Soper et al. | 219—441 |
| 3,025,384 | 3/62 | Schwaneke | 219—442 |

RICHARD M. WOOD, *Primary Examiner.*